March 13, 1962 H. P. DUPRE 3,025,492

TAPERED PIN COAXIAL CONNECTION

Filed Sept. 16, 1957 3 Sheets-Sheet 1

INVENTOR.
HENRY P. DUPRE
BY Ernest Famnik
ATTORNEY

March 13, 1962 H. P. DUPRE 3,025,492

TAPERED PIN COAXIAL CONNECTION

Filed Sept. 16, 1957 3 Sheets-Sheet 2

INVENTOR.
HENRY P. DUPRE

BY Ernest Janik

ATTORNEY

March 13, 1962 H. P. DUPRE 3,025,492

TAPERED PIN COAXIAL CONNECTION

Filed Sept. 16, 1957 3 Sheets-Sheet 3

INVENTOR.
HENRY P. DUPRE

BY Ernest Fanwick

ATTORNEY

United States Patent Office 3,025,492

Patented Mar. 13, 1962

3,025,492

TAPERED PIN COAXIAL CONNECTION

Henry P. Dupre, Wilton, Conn., assignor to Burndy Corporation, a corporation of New York Filed Sept. 16, 1957, Ser. No. 683,997
2 Claims. (Cl. 339—177)

My invention relates to electrical connectors and, more particularly, to electrical connectors in which a coaxial or shielded wire conductor is coupled to a panel or patchboard through which the electrical connection is made.

It is highly desirable that apparatus utilizing inputs of electrical and magnetic waves of high frequency be coupled with the same facility with which connections of lower frequency apparatus can be accomplished. However, the very nature of the energy used by high frequency apparatus requires a high quality transmission line such as coaxial or shielded wire conductors to be utilized. For example, in the demonstration of high fidelity audio components it is often desirable to be able to interconnect a great plurality of component apparatus in a large number of combinations through the use of coaxial conductors. In the past, electrical connections for coaxial cable have been extremely complicated to establish, thus hindering the demonstration of such equipment.

Most usually such coaxial or shielded wire conductors were terminated by connections which have required soldering the braid or outer conductor and the inner conductor elements to a terminal connector. The terminal connectors which were attached to the cable by soldering were then mated to receptacles or sockets in order to establish the electrical connection. The soldering of these terminal parts involved the handling of very small parts under awkward conditions, causing the attachment of a single cable terminal to be both tedious and time consuming.

In order to overcome some of the disadvantages of the above described connections, jumper wires were sometimes utilized to form a common grounding connection for all the cable terminals. These jumper wires joined each braided conductor to the next braided conductor in series and connected the last braided wire to the panel or patchboard in order to transmit the ground potential through the panel.

In order to overcome the objection of soldering components, solderless coaxial connectors were developed in which wedge shaped components were utilized to make mechanical and electrical connection between the outer conductor and the terminal of the cable. Such connectors, utilizing wedge shaped elements to force fit conductor portions, have not proven entirely satisfactory since the operator or user of the connector can break the connection by applying a tension between the cable end and the terminal, thus the assurance of always establishing a good connection and maintaining it has been lacking.

One of the principal objects of my invention, therefore, is to provide a coaxial cable or shielded wire connection through a panel or patchboard, that is simple to make, easy to install, that involves a minimum number of parts, and is relatively simple to manufacture.

Another object of my invention is to provide a coaxial or shielded wire connection in which the outer and inner conductors are positively and permanently coupled to the terminating portion of the connector.

Further objects of my invention are to provide such a connector that is installed by the pressure method, eliminating soldering operations and the use of bolts and nuts, or the use of wedge shaped components, and that may employ a tapered pin that can be force fitted into a receiving portion or socket of the panel in order to resist loosening and which is capable of being inserted before or after the shielded connection is established.

One of the features of my invention is to provide a connector for joining coaxial cable or shielded wire connections to a panel in which the inner and outer conductors are joined to the panel connector and which utilizes a tapered pin for terminating the inner conductor. The tapered pin may be inserted before or after the outer conductor connection is made by means of an impact insertion tool. The tapered pin is mechanically and electrically crimped to the inner conductor and an inner sleeve formed of a relatively hard metal is inserted beneath the outer conductor and an outer ring of a softer metal is inserted over the outer conductor and crimped thereto. An outer sleeve is electrically connected to the outer ring and provides electrical contact making means for connecting the outer conductor of the cable to the outer connection panel while the tapered pin is inserted into the inner connection panel.

The above mentioned and other features and objects of my invention will become more apparent by reference to the following description taken in conjunction with the accompanying drawings, in which.

Figures 1, 2:
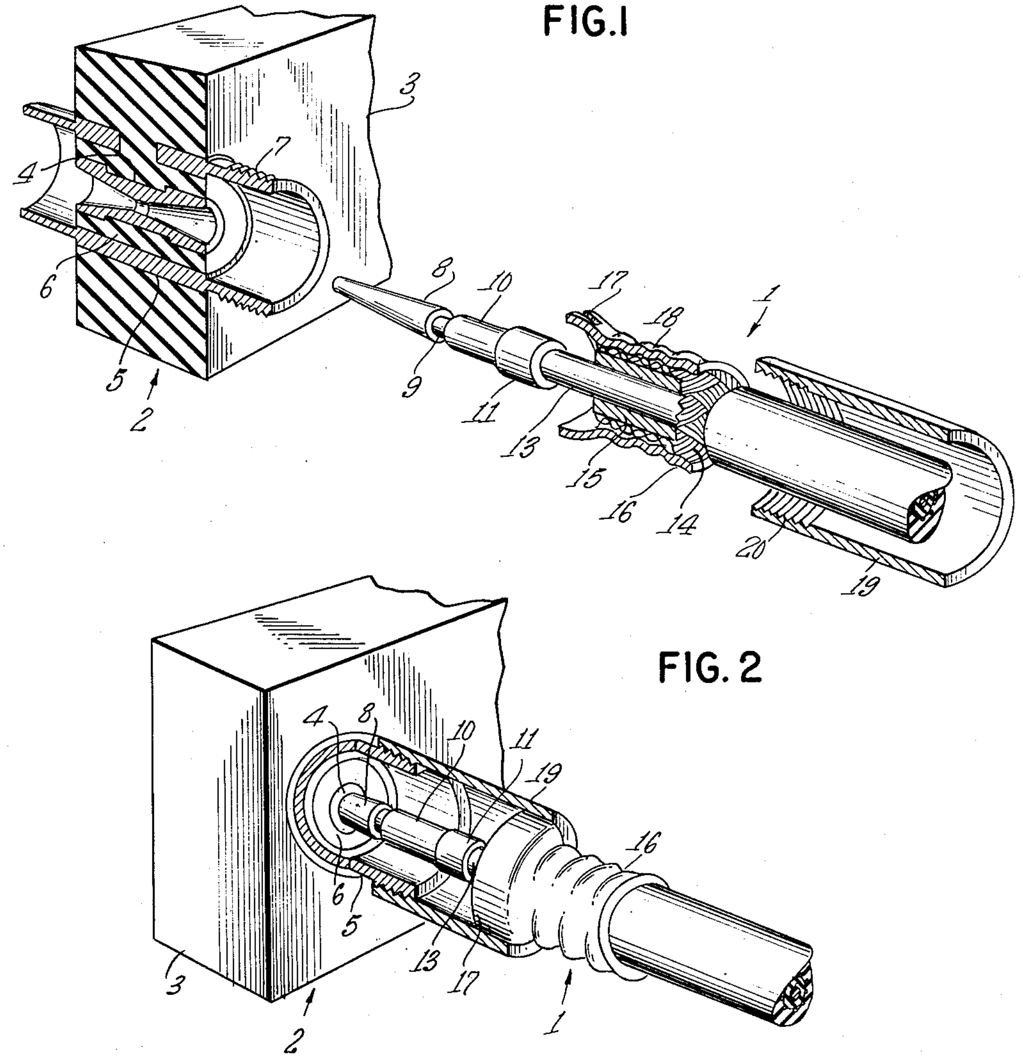
FIG. 1 is an exploded perspective view partly in section of one form of the panel connection of my invention.
FIG. 2 is a perspective view partly in section of the connection shown in FIG. 1.

Referring to FIGS. 1 and 2 of the drawing a panel connection in accordance with the principles of my invention is therein shown to comprise a cable termination 1 and a panel socket 2. Reference numeral 3 indicates a fragmentary portion of a panel wall made of electrical insulating material through which extends an inner socket 4 and an outer socket 5. The socket members 4 and 5 may be molded in spaced-apart relationship at the same time that the panel wall 3 is molded, and may be properly insulated from each other by insulation 6 which may be the wall material or a separate insulation spacer. The socket members 4 and 5 are suitably secured to the panel wall 3, preferably in a manner which makes the mounting leakproof. Outer socket member 5 extends beyond the panel wall 3 and terminates in an externally threaded portion 7 which is utilized to engage the cable termination 1. It is, of course, understood that a plurality of panel sockets 2 can be located in the panel wall 3 to provide a multiplicity of socket connections. The cable termination 1 of FIG. 2 comprises the tapered pin shaped member 8 which is impacted into the inner socket member 4 by the use of an insertion impacting tool (not shown). The insertion impacting tool utilizes the shoulder 9 to apply force to the tapered pin 8. The inner conductor is located in the conductor receiving socket 10 of the tapered pin and the insulation surrounding the inner conductor is located within the insulation gripping shroud 11. An indentation or crimping, secures the inner conductor of the cable to the socket conductor 10 and the shroud 11 is compressed to grip the insulation 13.

The braided outer conductor or shield 14 of the cable is exposed and trimmed back of the taper pin member 8 and the supporting ferrule or inner ring 15, composed of a relatively hard metal, is mounted or slid under the outer conductor 14 and over the inner conductor insulation 13. A malleable sleeve or outer ring 16 is crimped as shown at 18 over the outer conductor 14 to the supporting ferrule 15, thus the inner conductor of the cable is mechanically crimped to the taper pin 8 and the outer conductor 14 is mechanically crimped to the outer ring 16.

An outer conducting sleeve 19 is internally threaded at one end 20 to mate with the external threads 7 of the outer socket panel member 5. The end of the outer sleeve 19 slideably engages the expanded end 17 of the outer ring 16 and makes electrical contact therewith. End 17 may be slotted to provide resilient fingers to insure good electrical contact with sleeve 19. After the taper pin 8 has been impacted into the inner socket 4 the outer sleeve 19 may be mounted to the outer socket member 5 by relative rotation of the threads 7 and 20. The coaxial cable is thus electrically coupled to the socket 2 through the panel wall 3 to permit connection to an identical cable or suitably terminated connection on the other side of the wall 3, or the panel itself may be wired for interconnection between sockets on the same side.

Figures 3, 4:
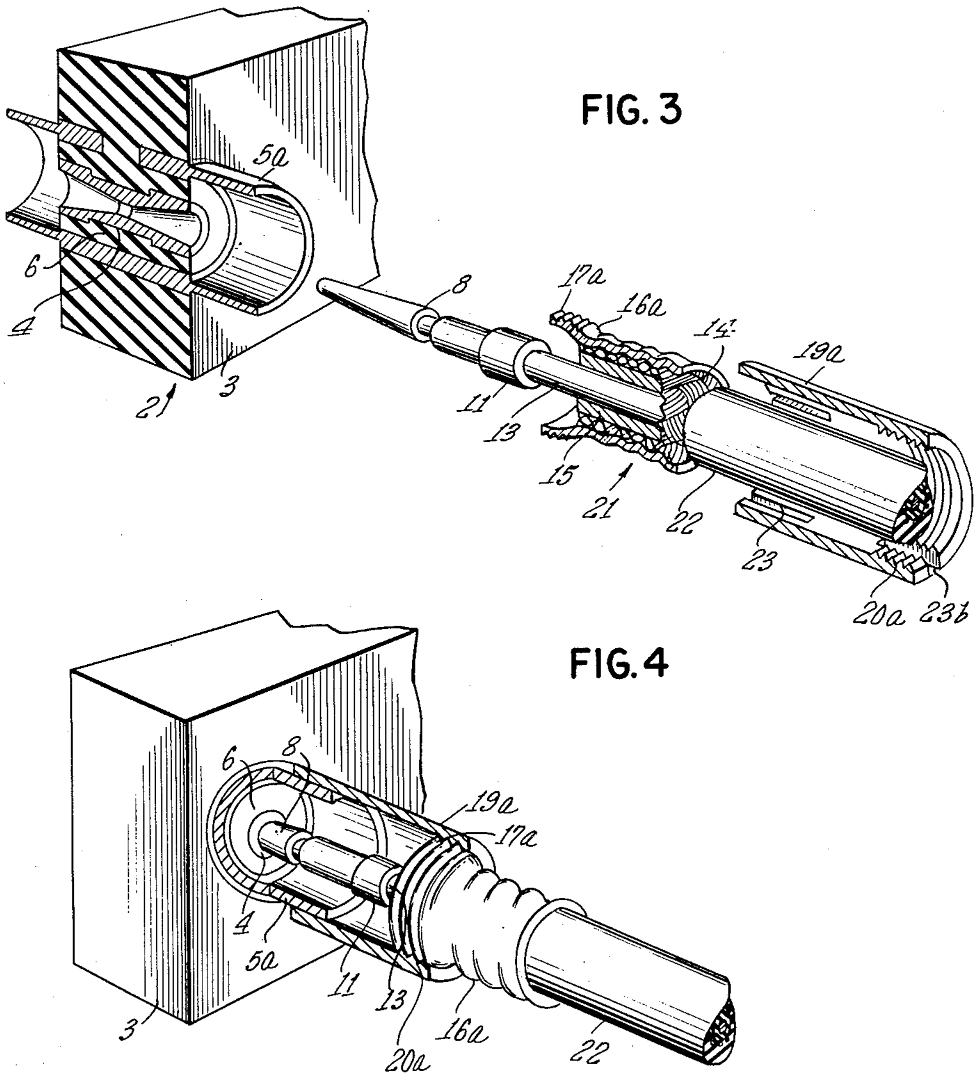
FIG. 3 is an exploded perspective view partly in section of another form of my invention.
FIG. 4 is a perspective view partly in section of the cable connection shown in FIG. 3.

Referring to FIGS. 3 and 4 of the drawing, parts identical to corresponding portions of the embodiment shown in FIGS. 1 and 2 are identified by similar numbers. The alternate embodiment of my invention shown in FIGS. 3 and 4 utilizes a panel socket 2 in the wall 3. The coaxial cable and shielded wire termination 21 uses a tapered pin 8 crimped onto the inner conductor of coaxial cable 22. An inner ring 15 is positioned between the inner conductor insulation 13 and the shielded wire or outer conductor 14. An outer ring **16*a*, made of malleable metal, is crimped onto the outer conductor 14 in the usual manner. The outer ring 16*a* has external threads 17*a* at one end thereof. An outer sleeve 19*a* has internal threads 20*a* at one end thereof to mate with threads 17*a*. The outer sleeve 19*a* may be slotted as at 23 to facilitate the coupling of the outer sleeve 19*a* to the outer socket member 5*a*. Thus after the cable termination 21 is coupled to coaxial cable 22 in the manner heretofore explained, the tapered pin 8 is impacted into the inner socket 4 and the outer sleeve 19*a* grips socket member 5*a* with the resilient fingers provided by slots 23 and rotated until threads 20*a* and 17*a* are fully mated. The threaded end of sleeve 19*a* may be slotted, as at 23*b*, to insure good electrical contact with ring 16**a.

Figures 5, 6:
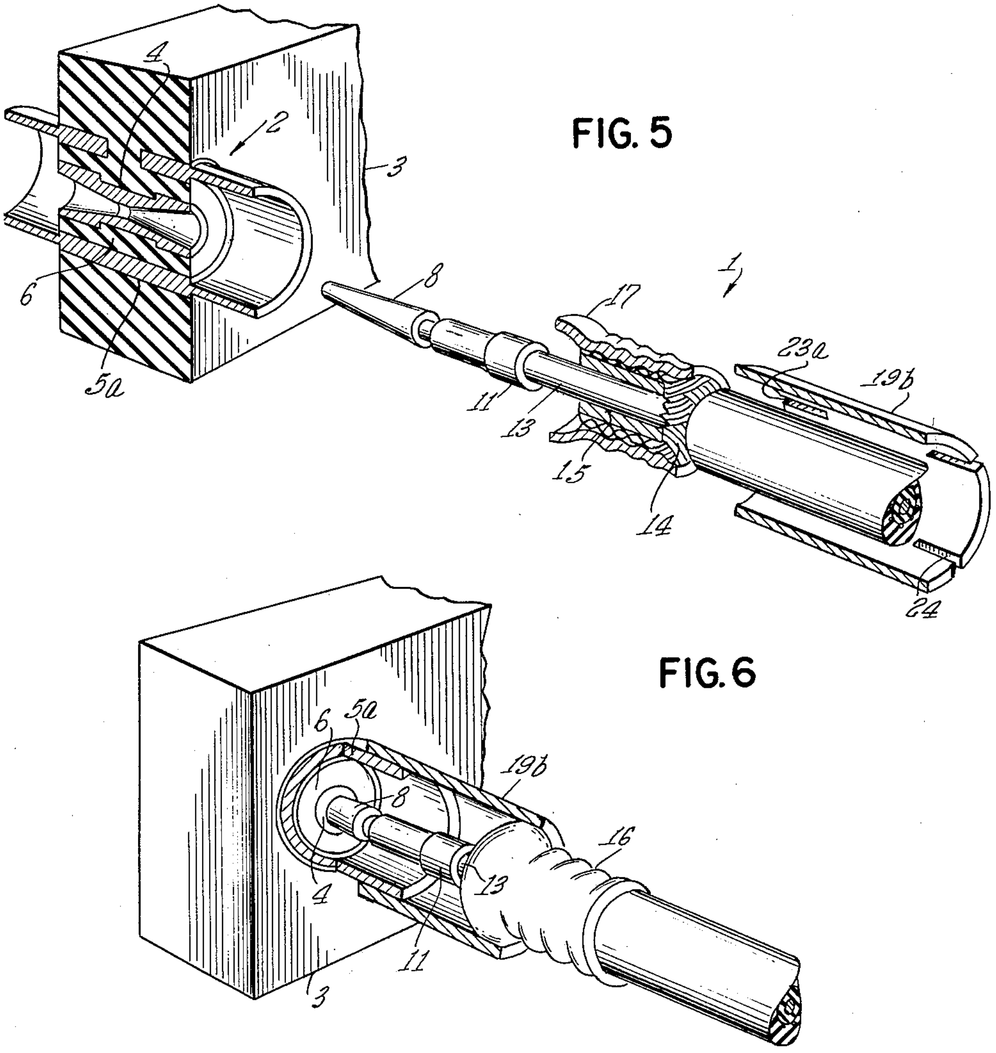
FIG. 5 is an exploded perspective view of a further modification of the panel connection of my invention.
FIG. 6 is a perspective view partly in section of the cable termination shown in FIG. 5.

Instead of threading the malleable outer ring **16*a* for threadable engagement with the outer sleeve 19*a*, a smooth wall 17 may be formed on the inner ring 16 as is shown in FIGS. 5 and 6. The outer sleeve 19*b* may be provided with slots 24 in place of threads 20*a* to provide resilient fingers to grip the smooth wall 17 of the sleeve inner ring 16 during installation. Slots 23*a* are provided to cause the outer sleeve 19*b* to tightly grip the panel socket outer member 5*a***.

While I have described above the principles of my invention in connection with specific apparatus, it is to be clearly understood that this description is made only by way of example and not as a limitation to the scope of my invention as set forth in the objects thereof and in the accompanying claims.

I claim:

1. A coaxial connection comprising: a coaxial cable including an inner conductor and an outer conductor coaxial with and insulated from said inner conductor; a female connector including a rigid, tapered inner socket having a solid annulus and an outer socket coaxial with and insulated from said inner socket; and a male connector including a tapered contact pin having an impact tool receiving shoulder connected to said inner cable conductor and disposed forward of said outer cable conductor, and in solid impacted engagement with said tapered inner socket; a conductive assembly of a pair of coaxial rings disposed longitudinally rearward of said tapered contact pin on said cable and securing the end of said outer cable conductor therebetween; and an outer conductive sleeve coupled between said outer socket and said ring assembly to electrically connect said outer conductor to said outer socket; said inner socket, tapered contact pin and inner cable conductor serving to longitudinally space said ring assembly a given distance from said outer socket; said outer sleeve being free to longitudinally slide on one integer of a group consisting of said outer socket and said ring assembly.

2. A connection according to claim 1 wherein said outer sleeve is longitudinally secured to the other integer of said group.

References Cited in the file of this patent

UNITED STATES PATENTS

| | | |
|---|---|---|
| 1,348,434 | Marschick | Aug. 3, 1920 |
| 2,328,111 | Thornberry | Aug. 31, 1943 |
| 2,761,110 | Edlen et al. | Aug. 28, 1956 |
| 2,762,025 | Melcher | Sept. 4, 1956 |
| 2,764,746 | Terlinde | Sept. 25, 1956 |
| 2,798,113 | Koller et al. | July 2, 1957 |
| 2,839,595 | Felts et al. | June 17, 1958 |
| 2,862,994 | Yeiser | Dec. 2, 1958 |
| 2,887,667 | Wolfe et al. | May 19, 1959 |
| 2,941,028 | Edlen et al. | June 14, 1960 |

FOREIGN PATENTS

| | | |
|---|---|---|
| 459,776 | Italy | Oct. 4, 1950 |
| 460,156 | Great Britain | Jan. 22, 1937 |
| 695,439 | Great Britain | Aug. 12, 1953 |